(12) United States Patent
Rydel

(10) Patent No.: US 6,424,254 B1
(45) Date of Patent: Jul. 23, 2002

(54) SECURE SYSTEM FOR CONTROLLING THE UNLOCKING OF AT LEAST ONE OPENABLE PANEL OF A MOTOR VEHICLE

(75) Inventor: Charles Rydel, Paris (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/568,583

(22) Filed: May 11, 2000

(30) Foreign Application Priority Data

May 11, 1999 (FR) .............................................. 99 05988

(51) Int. Cl.$^7$ ................................................ B60R 25/10
(52) U.S. Cl. ...................... 340/426; 340/5.61; 307/10.2
(58) Field of Search ................................ 340/426, 539, 340/573.6, 984, 5.61; 455/96; 180/272; 307/10.2–10.3, 10.4

(56) References Cited

U.S. PATENT DOCUMENTS

| | | | | |
|---|---|---|---|---|
| 5,552,641 A | * | 9/1996 | Fischer | 307/10.5 |
| 5,723,911 A | * | 3/1998 | Glehr | 340/426 |
| 5,929,769 A | * | 7/1999 | Garnault | 340/525.31 |

FOREIGN PATENT DOCUMENTS

| | | |
|---|---|---|
| DE | 4409167 C | 6/1995 |
| GB | 1595796 A | 8/1981 |
| GB | 2310300 A | 8/1987 |
| GB | 2309046 A | 7/1997 |

* cited by examiner

Primary Examiner—Anh La
(74) Attorney, Agent, or Firm—Liniak, Berenato, Longacre & Whhite

(57) ABSTRACT

A system for locking/unlocking at least one motor vehicle openable panel comprising transmission/reception devices which are intended for transmitting, from the vehicle, a radio-frequency interrogation signal, which transmission/reception devices are intended to be carried by a user and which, on receipt of the interrogation signal, are intended for transmitting a radio-frequency identification signal so as to actuate the unlocking of the openable panel, which system comprises detection unit which are linked to the transmission/reception devices on the vehicle and which are able to detect, on an identification signal received on the transmission/reception devices, a modification of a parameter of the transmission, between the transmission/reception means of the vehicle and of the user, which may be due to the interposition, between the vehicle and the user, of intermediate transmission/reception devices.

10 Claims, 3 Drawing Sheets

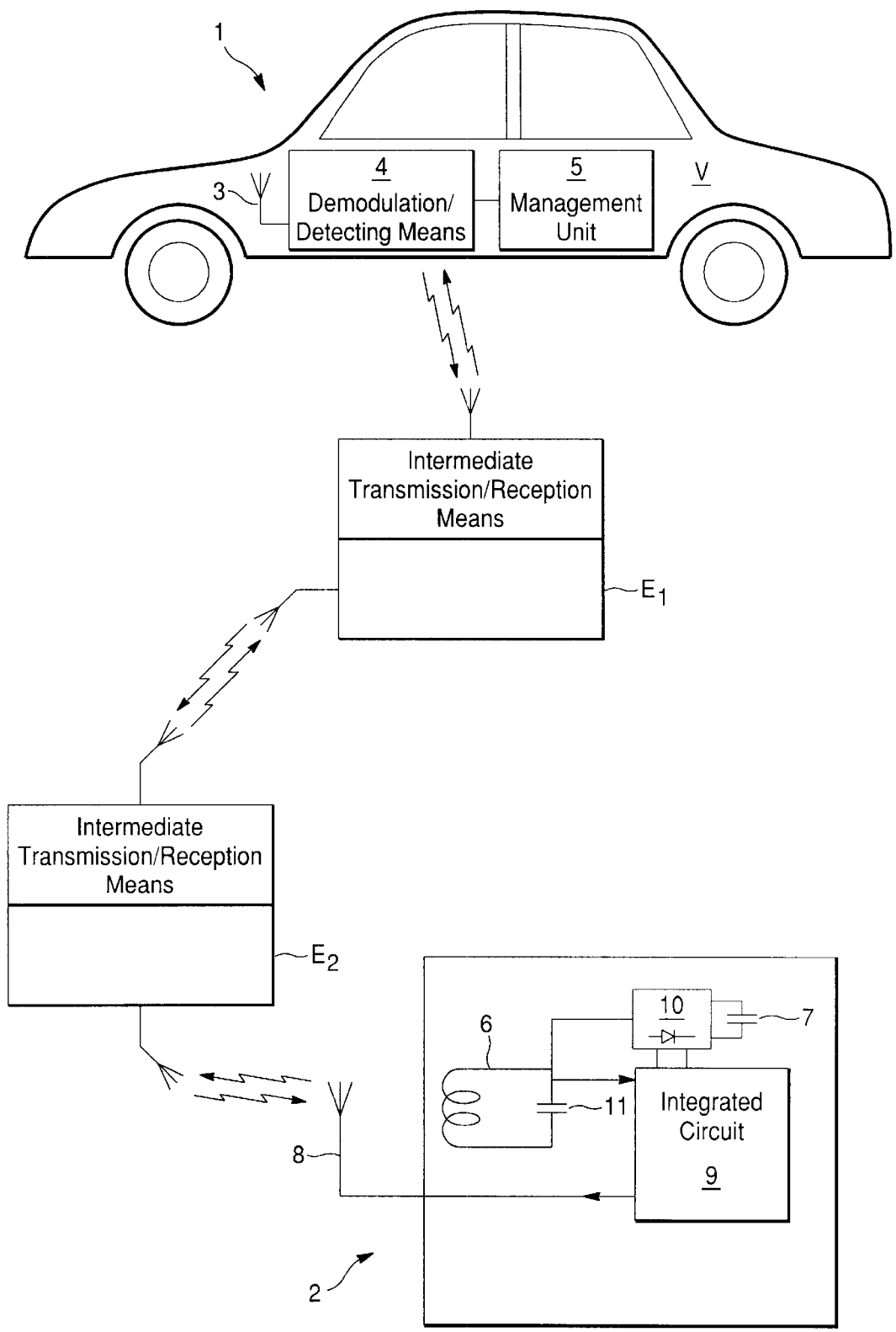

Fig. 2A
| 1 | 1 | 1 | -1 | -1 | -1 | -1 |
|---|---|---|----|----|----|----|
Fig. 2B
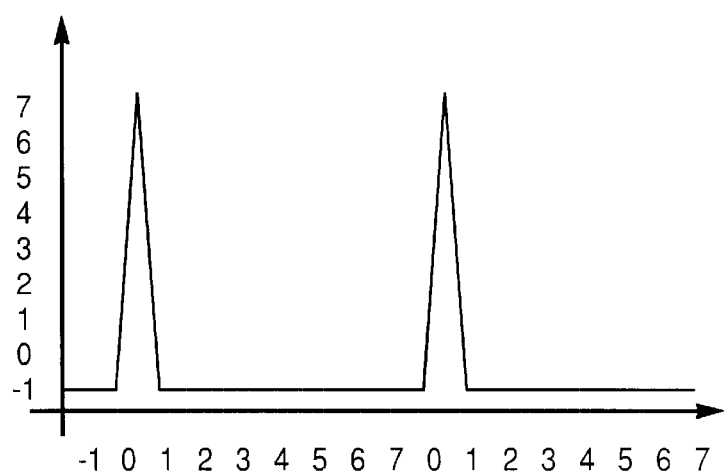
Fig. 2C
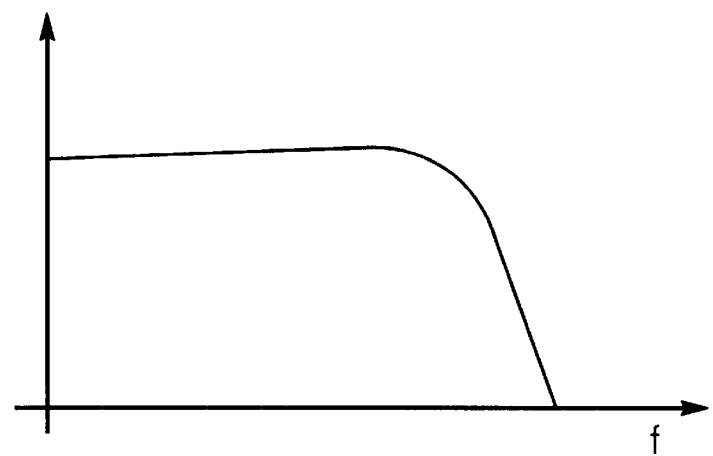

SECURE SYSTEM FOR CONTROLLING THE UNLOCKING OF AT LEAST ONE OPENABLE PANEL OF A MOTOR VEHICLE

BACKGROUND OF THE INVENTION

1. Field of the Invention

The present invention relates to a secure system for controlling the unlocking of at least one openable panel of motor vehicles.

2. Description of the Related Art

In the remote control systems currently used for unlocking motor vehicle doors, the user has to manually actuate his remote control (transponder built into the gripping part of his mechanical key) so as to actuate the unlocking of the doors.

Now, for greater user comfort, one wishes to do away with manipulations of this type.

So-called "hands-free" systems have recently been proposed, in which the user carries a transponder which is for example built into a badge. This transponder comprises, on the one hand, capacitive means which are charged when the said reception/transmission means receive a radio-frequency radiation and, on the other hand, an antenna into which the said capacitive means are discharged when this radiation disappears. On receiving a radio-frequency interrogation signal transmitted from the vehicle, the transponder itself transmits a radio-frequency identification signal in response. When this signal is received and identified by means provided for this purpose on the vehicle, these means control the unlocking of the openable panel.

Such a system is totally transparent to the user, since the unlocking of the doors is controlled without the user having to perform operations other than that consisting in his manipulating the handle of his door.

However, such "hands-free" systems pose security problems.

In particular, certain "ill-intentioned" persons may copy the interrogation signal transmitted from the vehicle so as to retransmit it near to the transponder, even were the user carrying this transponder to be located somewhere far from the vehicle. By employing suitable means near to the user, they store the identification signal transmitted in response by the transponder and retransmit this signal in the vicinity of the vehicle so as to obtain the unlocking of the latter's doors.

SUMMARY OF THE INVENTION

An aim of the invention is to propose a solution making it possible to prevent deceptions of this type.

The invention therefore proposes a system for controlling means for locking/unlocking at least one motor vehicle openable panel comprising transmission/reception means which are intended for transmitting, from the vehicle, a radio-frequency interrogation signal, which transmission/reception means are intended to be carried by a user and which, on receipt of the interrogation signal, are intended for transmitting a radio-frequency identification signal so as to actuate the unlocking of the openable panel, which system comprises detection means which are linked to the transmission/reception means on the vehicle and which are able to detect, on an identification signal received on the transmission/reception means, a modification of a parameter of the transmission, between the transmission/reception means of the vehicle and of the user, which may be due to the interposition, between the vehicle and the user, of intermediate transmission/reception means.

In particular, according to an advantageous embodiment, the transmission/reception means intended to be carried by the user consist of a transponder comprising capacitive means which are charged when the said transmission/reception means receive a radio-frequency radiation, as well as an antenna into which the said capacitive means are discharged when this radiation disappears and the detection means comprise means for detecting on an identification signal received on the transmission/reception means, a modification of a parameter of the transmission chain which carries out the transmission of the interrogation signal from the vehicle, its reception by the transponder, the transmission of the identification signal by the transponder and its reception on the vehicle.

Such a system is advantageously supplemented with the various following characteristics taken alone or according to all the technically possible combinations:

the interrogation signal transmitted from the vehicle is a signal which is split on at least two frequencies.

at least a part of the signal transmitted from the vehicle is modulated in amplitude and/or in phase and/or in frequency with a pseudo-random code.

the system comprises, on the vehicle, means able to determine a modification of a frequency signature on the identification signal received.

the system comprises, on the vehicle, means able to determine a modification of an impulse signature on the identification signal received.

the system comprises, on the vehicle, means for determining the correlation function between the interrogation signal and the identification signal received.

the system comprises means for analyzing the shape of the correlation function so as to detect the interposition of intermediate transmission/reception means between the vehicle and the user.

the system comprises means for calculating the Fourier Transform of the correlation function and for determining, as a function of this Fourier Transform, the passband of the signal transmission chain.

the system comprises, on the vehicle, means able to determine a delay on the identification signal received.

the system comprises means for determining the delay by which the interrogation signal must be shifted as appropriate to obtain a correlation peak.

BRIEF DESCRIPTION OF THE DRAWINGS

Other characteristics and advantages of the invention will become further apparent from the description which follows which is purely illustrative and non-limiting and which should be read in conjunction with the appended drawings in which:

FIG. 1b illustrates the same system with intermediate transmission/reception means interposed by "ill-intentioned" persons;

FIG. 2a illustrates an exemplary pseudo-random code;

FIG. 2b represents as a function of the number of shift bits the correlation function between the pseudo-random code of FIG. 2a and the same code shifted according to a circular register;

FIG. 2c represents the Fourier Transform of the correlation function of FIG. 2b.

DETAILED DESCRIPTION OF THE PREFERRED EMBODIMENT

Figure 1A:
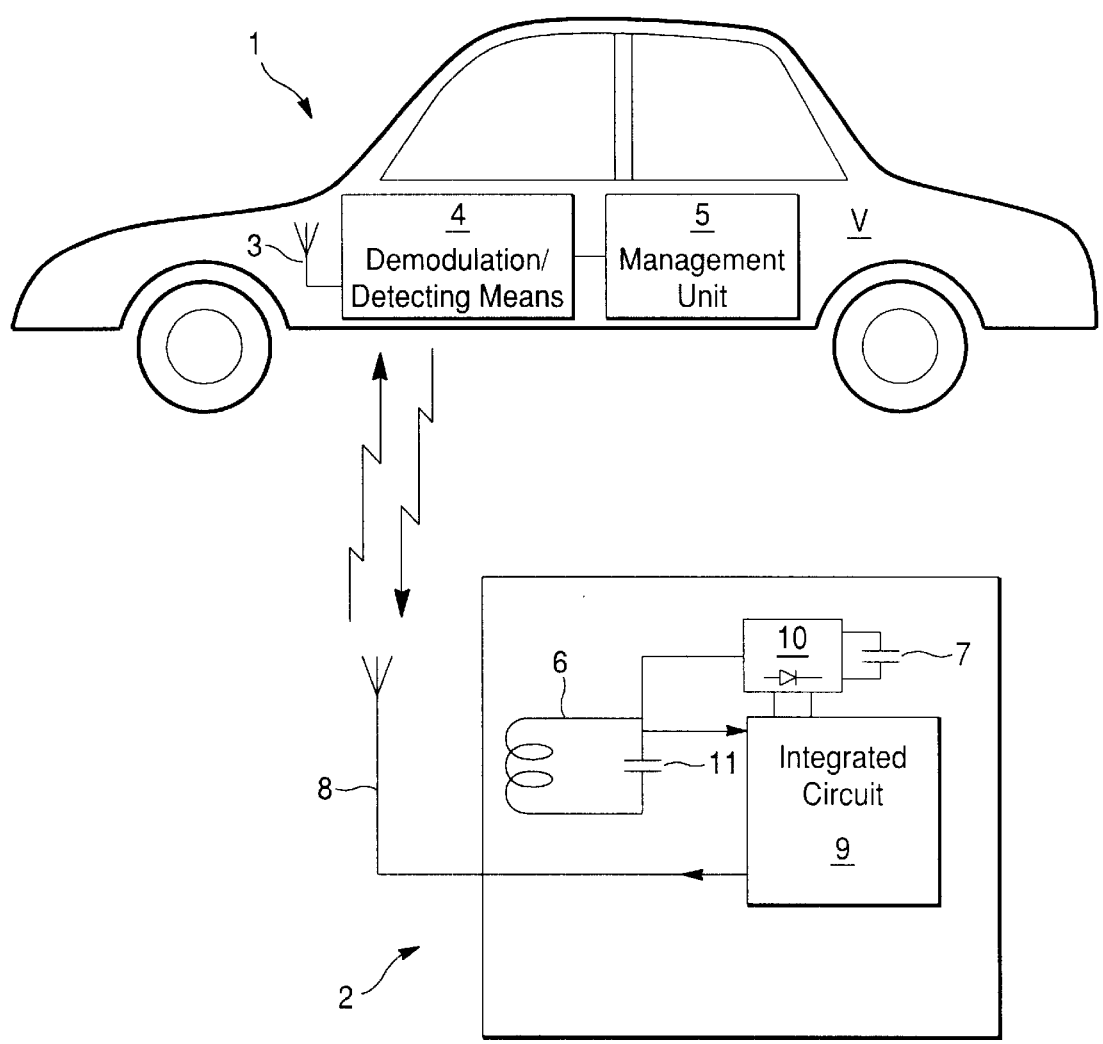
FIG. 1a is a schematic representation illustrating a system in accordance with the invention.

Represented in FIG. 1a a vehicle V which carries transmission/reception means 1 intended for exchanging with a transponder 2.

The transmission/reception means 1 comprise an antenna 3 disposed for example near to a door handle of the vehicle, or in this handle, as well as demodulation and detection means 4 and a management unit 5 to which these means 4 are linked.

The transponder 2 comprises for its part a secondary winding 6 at the terminals of which is arranged a capacitor 11 forming a tuned circuit. It also comprises a transmission antenna 8, as well as an integrated circuit 9 which is linked on the one hand to the secondary winding 6 and to the capacitor 11 to the antenna 8 as well as to the capacitive means 7 of a rectifying block 10. The integrated circuit 9 comprises storage means in which is stored a code allowing the identification of the transponder 2 by the vehicle.

The vehicle V comprises means intended for making it possible to detect the presence of an individual near to the vehicle. These means consist for example of sensors disposed in the handles of the doors and making it possible to detect that an individual is placing his hand close to a handle or is actuating the latter.

When the presence of an individual near to the vehicle is detected by these means, the means 1 transmit a radio-frequency interrogation signal.

The radio-frequency radiation of this signal is received by the secondary winding 6 of the transponder 2 and charges the capacitor 7. When this radiation is interrupted, the said capacitor 7 discharges across the integrated circuit 9. The said antenna 8 then transmits a radio-frequency signal which corresponds to the radio-frequency signal received from the means 1 and which moreover is modulated in amplitude, in phase or in frequency by the integrated circuit 9.

This signal carries the identification code of the transponder 2 and, on reception and demodulation by the means 1 and 4, triggers the control of the means for locking/unlocking the doors by the unit 5.

Apart from the demodulation of the signal received, the means 4 implement on this signal a processing which makes it possible to detect a modification of a parameter of the transmission chain which carries out the transmission and the reception of the interrogation signal, then the reception and the transmission of the identification signal.

According to a first advantageous embodiment, the interrogation signal transmitted by the means 1 is frequency-modulated by the said means 1, so as to be split onto at least two frequencies, for example equal to 125 kHz and 112.5 kHz.

The transponder 2 transmits an identification signal in response which employs the same ratio of modulation levels. Relative to the two frequencies of the interrogation signal which was initially transmitted by the means 1, the two frequencies of the identification signal exhibit a certain attenuation with respect to one another.

This relative attenuation constitutes a frequency signature of the transponder 2.

Now, if intermediate transmission/reception means (E1, E2 in FIG. 1b) are interposed between the vehicle and the transponder 2 by ill-intentioned persons, the relative attenuation of the two components of the identification signal will a priori be modified.

The means 4 comprise means which prevent the unlocking of the openable panels of the vehicle or/and which warn through an appropriate signal of the attempted break-in (alarm, information through a "bleep" system of the owner of the vehicle) when the difference of the relative attenuation of the two components of the signal received and of an expected theoretical attenuation is greater than a given threshold.

This is why, according to another preferred embodiment, a spread-spectrum signal is used as interrogation signal, and in particular a signal at least a part of which is modulated in amplitude, in frequency or in phase with a binary code of pseudo-random type.

The pseudo-random codes (also called maximum-length codes) are conventionally known and have spectral properties similar to those of white noise whilst being deterministic.

An exemplary maximum-length sequence coded on 7 bits is given in FIG. 2a. The values of the bits of this sequence are by convention chosen equal to 1 and −1.

The value of the autocorrelation function of such a sequence is calculated by multiplying the sequence with itself bit by bit and by adding together the values obtained with the various bits. This value of autocorrelation function is equal to 7.

The value of the correlation function which correlates such a sequence with the same sequence shifted by a number of bits lying between 1 and 6 is equal to −1 in all cases.

FIG. 2b represents, as a function of the number of shifting bits, the correlation function which correlates this sequence and the same sequence shifted in a circular register. It is observed that this correlation function is pulse-like.

This is a general property of pseudo-random codes, the correlation functions of which are similar to those of white noise and are substantially equal to Dirac spikes.

Consequently, in the absence of intermediate transmission/reception means interposed between the vehicle and the user, the correlation function correlating the identification signal received and the interrogation signal is a given impulse response.

On the other hand, in the presence of intermediate transmission/reception means, the correlation function correlating the identification signal received and the interrogation signal is deformed relative to the given impulse response. The moment at which the correlation maximum appears is moreover delayed.

As will have been understood, the means 4 comprise means for determining this correlation function and for analyzing the shape of the response obtained and/or the delay by which one or other of the two signals must be shifted as appropriate to obtain a correlation peak, so as to detect the interposition of transmission/reception means between the vehicle V and the transponder 2.

The calculation of the correlation function is for example carried out by implementing an FHT (Fast Hadamar Fourier Transform) processing.

An analysis of the shape of the response obtained can for example implement a processing by the method of least squares.

A detection regarding the time by which one or other of the two signals must be shifted as appropriate to obtain a correlation peak can for example implement a comparison with given threshold values.

As a further variant, a Fourier Transform calculation can be implemented on the correlation function.

In the case where the correlation function is actually pulse-like, the Fourier Transform is, as illustrated in FIG. 2c, a plateau extending over the width of the passband of the transmission chain which provides for the transmission and the reception of the interrogation signal and the transmission and reception of the identification signal.

Measurement of the width of this band and comparison of the width thus measured with a threshold value makes it possible to detect the interposition of transmission/reception means between the vehicle V and the transponder 2.

The calculation of the Fourier Transform can be performed by implementing a fast Fourier Transform (FFT) calculation.

It will be noted that the systems just described have the advantage of making the transmissions between the vehicle and the transponder secure without requiring additional means of calculation or of memory power at the level of the transponder. The latter can therefore be of reduced bulk and exhibit low consumption (less than 1 μA).

The device does not implement systems using clocks for the detection of any delays in the exchange (question/response) between the badge and the vehicle since these systems require a level of accuracy which is difficult to achieve.

What is claimed is:

1. A system for controlling means for locking/unlocking at least one motor vehicle openable panel comprising transmission/reception means which are intended for transmitting, from the vehicle, a radio-frequency interrogation signal, which transmission/reception means are intended to be carried by a user and which, on receipt of the interrogation signal, are intended for transmitting a radio-frequency identification signal so as to actuate the unlocking of the openable panel, which system comprises detection means which are linked to the transmission/reception means on the vehicle and which are able to detect, on an identification signal received on the transmission/reception means, a modification of a parameter of the transmission, between the transmission/reception means of the vehicle and of the user, which is due to the interposition, between the vehicle and the user, of intermediate transmission/reception means.

2. The system as claimed in claim 1, wherein the transmission/reception means intended to be carried by the user consist of a transponder comprising capacitive means which are charged when the said transmission/reception means receive a radio-frequency. radiation, as well as an antenna into which the said capacitive means are discharged when this radiation disappears and wherein the detection means comprise means for detecting on an identification signal received on the transmission/reception means, a modification of a parameter of the transmission chain which carries out the transmission of the interrogation signal from the vehicle, its reception by the transponder, the transmission of the identification signal by the transponder and its reception on the vehicle.

3. The system as claimed in claim 2, wherein the interrogation signal transmitted from the vehicle is a signal which is split on at least two frequencies.

4. The system as claimed in claim 3, wherein at least a part of the signal transmitted from the vehicle is modulated in at least one or more of amplitude, phase and frequency with a pseudo-random code.

5. The system as claimed in claim 4, which comprises, on the vehicle, means able to determine a modification of at least one of a frequency signature and an impulse signature on the identification signal received.

6. The system as claimed in claim 5, which comprises, on the vehicle, means able to determine an impulse signature.

7. The system as claimed in claim 4, which comprises, on the vehicle, means for determining the correlation function between the interrogation signal and the identification signal.

8. The system as claimed in claim 7, which comprises means for analyzing the shape of the correlation function so as to detect the interposition of intermediate transmission/reception means between the vehicle and the user.

9. The system as claimed in claim 7, which comprises means for calculation the Fourier Transform of the correlation function and for determining, as a function of this Fourier Transform, the passband of the signal transmission chain.

10. The system as claimed in claim 7, which comprises means for determining the delay by which the interrogation signal must be shifted as appropriate to obtain a correlation peak.

* * * * *